United States Patent [19]

Tanaka et al.

[11] Patent Number: 4,685,437

[45] Date of Patent: Aug. 11, 1987

[54] INTAKE AIR HEATER FOR INTERNAL COMBUSTION ENGINE WITH PERFORATED PLATE HEATER ELEMENT PARTIALLY TRAVERSING AIR PASSAGE

[75] Inventors: Toshiaki Tanaka, Toyota; Hitoshi Niwa, Kariya; Hirokatsu Mukai, Kariya; Naoto Miwa, Kariya; Akio Nara, Kariya; Etsuji Nomura, Kariya; Makoto Hori, Kariya; Koichi Hasegawa; Hiroshi Noguchi, both of Toyota, all of Japan

[73] Assignees: Toyota Jidosha Kabushiki Kaisha, Toyota; Nippondenso Kabushiki Kaisha, Kariya, both of Japan

[21] Appl. No.: 772,904

[22] Filed: Sep. 5, 1985

[30] Foreign Application Priority Data

Sep. 5, 1984 [JP] Japan .............................. 59-134890[U]
Sep. 5, 1984 [JP] Japan .............................. 59-134891[U]
Sep. 5, 1984 [JP] Japan .............................. 59-134892[U]
Sep. 5, 1984 [JP] Japan .............................. 59-134893[U]
Sep. 5, 1984 [JP] Japan .............................. 59-134894[U]
Sep. 5, 1984 [JP] Japan .............................. 59-134895[U]

[51] Int. Cl.⁴ ............................................. F02M 31/12
[52] U.S. Cl. ..................................... 123/549; 123/556

[58] Field of Search .................................. 123/549, 556

[56] References Cited

U.S. PATENT DOCUMENTS

| 2,192,067 | 2/1940 | Betry .................................... 123/549 |
| 4,384,563 | 5/1983 | Siefer et al. ...................... 123/549 X |
| 4,387,690 | 6/1983 | Chiavaroli ........................... 123/549 |
| 4,450,823 | 5/1984 | Abe et al. ............................ 123/549 |

FOREIGN PATENT DOCUMENTS

| 0114326 | 9/1929 | Fed. Rep. of Germany ...... 123/549 |
| 0032961 | 2/1983 | Japan ................................... 123/549 |

Primary Examiner—Willis R. Wolfe, Jr.
Attorney, Agent, or Firm—Oblon, Fisher, Spivak, McClelland & Maier

[57] ABSTRACT

An air heater for heating intake air for an internal combustion engine only in cold start or further warming up operation, having a frame which defines an opening for passing air therethrough, and at least one heater element in the shape of a perforated plate such as a lattice or honeycomb plate supported by the frame so as to traverse only a part of the opening area of the air passage opening, while leaving a substantial part of the opening area free as untraversed by the heater element.

3 Claims, 21 Drawing Figures

INTAKE AIR HEATER FOR INTERNAL COMBUSTION ENGINE WITH PERFORATED PLATE HEATER ELEMENT PARTIALLY TRAVERSING AIR PASSAGE

BACKGROUND OF THE INVENTION

1. Field of the Invention

The present invention relates to an air heater, and particularly to an air heater for heating intake air for an internal combustion engine of the type incorporated at the entrance or at a middle portion of the air intake passage of the engine for heating intake air during cold starting or further warming up of the engine.

2. Description of the Prior Art

It is known to employ an air heater in order to improve cold starting or further warming up performance of an internal combustion engine, particularly an engine of the diesel type. It is also known to employ, as a heating element of such an air heater, an element having a ceramic body of a perforated structure, selected surface portions of which are applied with electro-conductive layers which operate as electrodes, generally referred to as a PTC heater, as it is generally made to show a positive thermal coefficient. The ceramic material for such a purpose has high configurational flexibility as compared with metallic materials for heater elements and can be readily formed into a perforated plate having a lattice structure or a honeycomb structure which provides a large heating surface which increases more as the mesh of the lattice or honeycomb structure becomes finer.

It is more desirable from the view point of facilitating cold starting and further warming up of the engine to increase the heating surface area of such a heater element, while on the other hand the increased fineness of the mesh also increases the flow resistance applied to the intake air conducted therethrough, thereby increasing the pressure drop in the intake system of the engine, resulting in the droppage of the engine output power. Therefore, in the intake air heater of the type which employs a heater element in the form of a perforated plate such as a lattice plate or a honeycomb plate which traverses the intake air passage, a compromise has been conventionally made with regard to the balance between the air heating capacity available by the heater element and the pressure drop incurred thereby. In this case, in the conventional heater structure wherein the perforated plate heater element traverses the entire cross section of the intake passage of the engine, the above-mentioned compromise was only unilaterally conditioned by the characteristics of the heating capacity which monotonously increases according to increase of the fineness of the lattice or honeycomb structure and the characteristics of the flow resistance which also monotonously increases according to increase of the fineness of the lattice or honeycomb structure.

SUMMARY OF THE INVENTION

The present invention is to propose a new air heating structure which employs a perforated plate heater element such as a lattice or honeycomb plate heater element and which is particularly advantageous as an air heater to be incorporated in an intake passage of an internal combustion engine for heating intake air only during cold starting or further warming up of the engine.

When an internal combustion engine is started from a cold state, it is desirable that the intake air be preheated. However, when the engine has once been started or further warmed up to a normal operating condition, preheating of the intake air adversely affects the performance of the engine by reducing the net amount of intake air. Therefore, the air heater incorporated in the intake passage of an internal combustion engine is a heating device which is operated only in the starting or further warming up operation of the engine, in which the load on the engine is low, and therefore the flow rate of air through the intake passage, and the heater element therein incorporated, is low. The heating effect applied to the air which traverses the perforated plate heater element is generally proportional to the heating surface of the heater element, and therefore, generally proportional to the flow resistance of the heater element. On the other hand the pressure drop incurred to the flow of air traversing the heater element is proportional to the flow resistance of the heater element and also proportional to a square of the air flow speed, i.e. the flow amount of intake air, or engine load. According to these conditions, if the perforated plate heater element is arranged to traverse only a part of the cross section of the intake air flow passage while leaving the remaining part of the cross section free as untraversed by the heater element, a design of such a heater element which provides the same heating capacity and the same flow resistance in a low load operation of the engine such as starting or warming up operation as a heating element according to the conventional full traverse design would be able to provide a substantially lower flow resistance in normal power operation of the engine.

It is assumed that the flow resistance of a conventional full traverse heater element is $R_0$, while the flow resistance of a heater element which traverses a part of the cross section of an air intake passage is $R_1$, whereas the flow resistance of the free passage left asides the heater element is $R_2$. It is also assumed that, in a low load operation of the engine, air flow amounts across resistances $R_0$, $R_1$, and $R_2$ are $I_{0a}$, $I_{1a}$, and $I_{2a}$, respectively, and in a normal load operation of the engine, air flow amounts across resistances $R_0$, $R_1$, and $R_2$ are $I_{0b}$, $I_{1b}$, and $I_{2b}$, respectively.

With regard to the pressure drop across the air heater, there exist the flowing conditions:

$$R_0 I_{0a}^2 = R_1 I_{1a}^2 = R_2 I_{2a}^2$$

$$R_1 I_{1b}^2 = R_2 I_{2b}^2$$

From the conditions that the same heating capacity should be available at the low load operation, and that the heating capacity is approximately proportional to the flow resistance of the heater element and also to the air flow which traverses the heater element, there exists the flowing condition:

$$R_0 I_{0a} = R_1 I_{1a}$$

The difference in the pressure drop across the heater element at normal load operation between the partial traverse heater element and the full traverse heater element is as follows:

$$R_1 I_{1b}^2 / R_0 I_{0b}^2$$
$$(= R_2 I_{2b}^2 / R_0 I_{0b}^2) = (I_{0a}/I_{1a}) \times (I_{1b}^2/I_{0b}^2) = (I_{1a}$$

$$+I_{2a}/I_{1a} \times (I_{1b}/I_{0b})^2 = (1 + I_{2a}/I_{1a}) \times (I_{1b}/(I_{1b}/(I_{1b}+I_{2b}))^2$$

Since $I_{2a}/I_{1a} = I_{2b}/I_{1b}$ = square root of $R_1/R_2$ = const (r), the above ratio is $(1+r) \times (1/(1+r))^2 = 1/(1+r)$
If it is so designed that the ratio $R_1/R_2 = 4$, then $r = 2$ the above ratio of the pressure drops is: $\frac{1}{3}$ This means that at the same normal load operation of the engine the pressure drop across the partial traverse heater element is one third of the pressure drop across the full traverse heater element.

Therefore, the essential feature of the present invention is to provide an air heater for heating intake air for an internal combution engine, comprising a frame means for defining an opening for passing air therethrough, and at least one piece of heater element in the form of a perforated plate supported by said frame means so as to traverse a predetermined part of the opening area of said opening, a substantial part of said opening area being left free as untraversed by said heater element.

By employing an air heater of the abovementioned structure in the air intake system of an internal combustion engine, during cold starting or further warming up operation of the engine, preheating of intake air of the same performance as available by the conventional air heater which incorporates a perforated plate heater element traversing the full cross section of the intake passage is obtained with regard to the air heating capacity as well as the pressure drop incurred to the flow of intake air, and in normal load operation of the engine, wherein no air heating is performed, the pressure drop incurred to the flow of intake air is substantially reduced as compared with the case of the conventional air heater.

Further, according to the abovementioned structure of the air heater of the present invention, the heater element in the form of a perforated plate such as a lattice plate or a honeycomb plate may be used in a regular form such as a rectangular form having a uniform arrangement of meshes with no need of partial modifications of the arrangement of meshes. In general, lattice plates or honeycomb plates are formed by the extrusion process which extrudes a mass of fluidal material through a die having openings in the shape of a lattice of honeycomb design. Therefore, it is almost essential that the lattice or honeycomb design is a uniform design including no partially thick or thin design portions over the entire cross section thereof. Particularly when such a lattice or honeycomb structure is made of a ceramic material which is generally very brittle and lacks in elasticity and tenacity, the abovementioned uniformity of the cross section is more important in order to obtain actually useful products. According to the present invention, such a problem can be completely avoided due to the fact that the part of the cross section of the intake air passage which is to be traversed by the heater element and the other part thereof which is to be left free of any heater element traversing are provided by merely employing at least one piece of heater element which does not fully traverse the entire cross section of the intake passage.

A further feature of the present invention is to use two pieces of heater elements of the perforated plate form to traverse only a part of the cross section of the intake passage. By using two pieces of heater elements it is readily possible to obtain a symmetrical design for the cross section of the intake passage such that the part of free of the heater element is located at a central portion of the cross section for improving the uniformity of the air heating effect applied to the air conducted through the air heater. This is very advantageous in the case of a multi-cylinder engine wherein a plurality of engine cylinders are supplied with intake air through a manifold whose upstreem portion is a single passage where the air heater will be located. Of course the two pieces of heater elements may desirably be of exactly the same shape and size with one another.

BRIEF DESCRIPTION OF THE DRAWINGS

The present invention will now be shown and described with reference to some preferred embodiments thereof, and with reference to the illustrative drawings. It should be clearly understood, however, that the descriptions of the embodiments, and the drawings, are all of them given purely for the purpose of explanation and exemplification only, and are none of them intended to be limitative of the scope of the present invention in any way, since the scope the present invention is to be defined solely by the legitimate and proper scope of the appended claims. In the drawings, like parts and features are denoted by like reference numerals in various figures thereof, and:

FIGS. 13 and 14 are a set of views similar to the set of FIGS. 11 and 12, showing a sixth embodiment of the present invention, wherein FIG. 14 is a sectional view along line XIV—XIV in FIG. 13;

FIG. 18, 19 and 20 are a set of views similar to the set of FIG. 1-3, showing an eighth embodiment of the present invention, wherein

DESCRIPTION OF THE PREFERRED EMBODIMENTS

Figure 1:
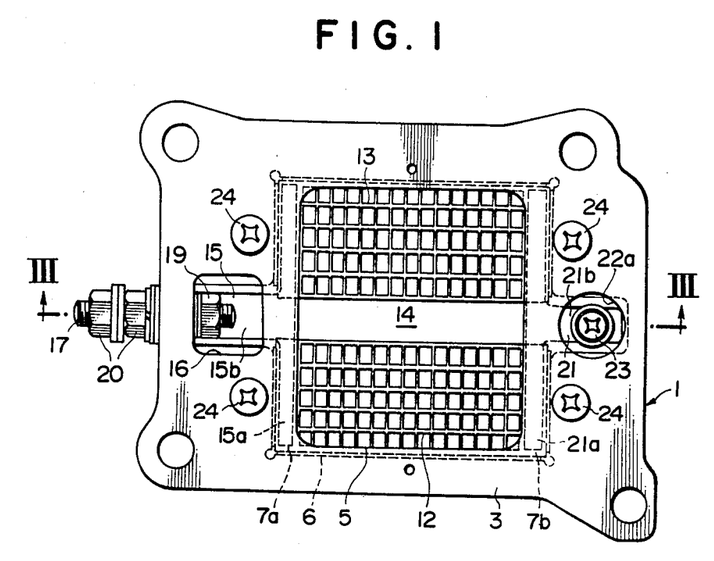
FIG. 1 is a top view of a first embodiment of the air heater according to the present invention.
Figure 2:
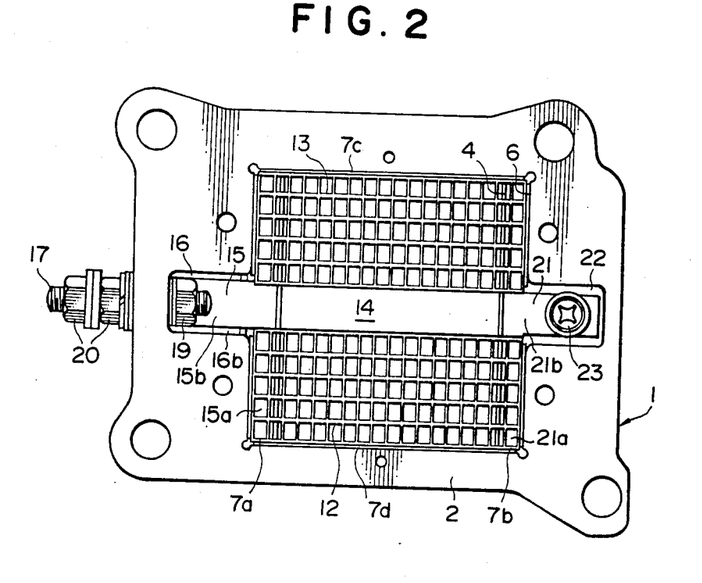
FIG. 2 is a view similar to FIG. 1, showing the inside of the heater shown in FIG. 1, with an upper half portion of the frame being removed so as to expose the full configuration of the heater element.
Figure 3:
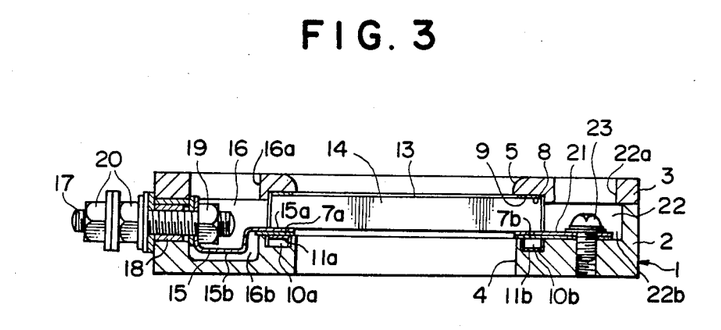
FIG. 3 is a sectional view along line III—III in FIG. 1.

Referring to FIGS. 1-3 showing a first embodiment of the air heater according to the present invention, the air heater generally designated by reference numeral 1 comprises an annular frame means which is an assembly of a first frame member 2 and a second frame member 3, each having a generally rectangular configuration which is substantially the same as one another. The lower (i.e. note that for the convenience of description "lower" and "upper" will be used hereinunder based upon the assumption that the top views are to look vertically downwardly at the generally flat shaped air heater flatly placed on a horizontal surface.) half frame member 2 is formed with a rectangular central opening 4 which defines an opening for passing a flow of air such as intake air for an internal combustion engine. Similarly, an upper half frame member 3 is also formed with a substantially rectangular central opening 5, though it is slightly rounded at four corner portions thereof. The frame member 2 is formed with a relatively shallow rectangular cavity 76 at a central portion thereof including the opening 4 and slightly larger than the opening 4 as viewed in the top view so as to leave an annular step portion around the opening 4. Similarly, the upper frame member 3 is formed with a shallow cavity 8 at a central portion thereof including the opening 5 and slightly larger than the opening 5, thereby also providing an annular step portion 9 around the opening 5.

The annular step portion includes wider portions 7a and 7b located along two opposite sides of the rectangular opening 4 as compared to narrower strip portions 7c and 7d located along the other two opposite sides of the rectangular opening 4. Along these wider strip portions 7a and 7b there are formed linear grooves 10a and 10b, respectively, in which are mounted leaf springs 11a and 11b, respectively. These leaf springs may be corrugated strip springs.

Figure 21:
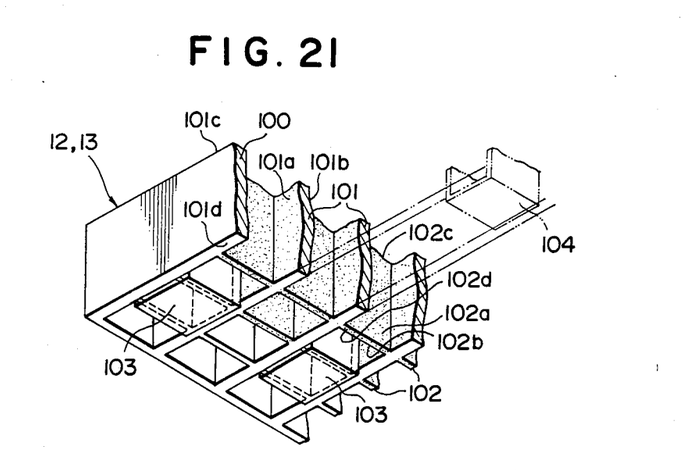
FIG. 21 is a looking up perspective view of a corner portion of the heater element incorporated in the embodiment shown in FIGS. 18-20.

Reference numbers 12 and 13 designate two heater elements, each being formed as a rectangular lattice plate. In the shown embodiment the heater elements 12 and 13 are exactly of the same kind of products having the same dimensions. The heater element of this kind is already known. It has a body of a lattice structure made of a ceramic material such as, for example, a mixture of barium titanate and some rare earth elements. This lattice body operates as a Joule heat generating means, and selected surface portions of the lattice structure are treated to have very thin double layers of nickel and silver which serve as electrode elements. A portion of such an element is shown in FIG. 21, though this element herein shown incorporates an aspect of the invention proposed by the present application which will be described later, wherein the frame structure made of a ceramic is designated by reference numeral 100, and the surface portions thereof on which the electrode layers are provided are shown with fine dots, while other surfaces where no electrode layer is provided is left in paper's white. By the electrode layers being provided as shown in the figure, i.e. on opposite side surfaces 101a and 101b of longitudinal ribs 101, opposite side surfaces 102a and 102b of lateral ribs 102, and top and bottom surfaces 102c and 102d of the lateral ribs 102, except the portions thereof which cross the longitudinal ribs 101, and by a first set of electric terminal elements 103 being mounted into alternate mesh spaces between first pairs of longitudinal ribs 101 at one longitudinal end portions thereof, while a second set of electric terminal elements 104 are mounted into alternate mesh spaces between second pairs of longitudinal ribs 101 at the other longitudinal end portions thereof, the ceramic body of each longitudinal ribs operates as a Joule heat generator, when an electric power is supplied between said first and second set of electric terminal elements 103 and 104, electric currents flowing to traverse the thichness of each longitudinal rib 101 from one of the side surfaces 101a and 101b toward the other.

When the lower and upper frame members 2 and 3 are joined together to lay one over the other and fastened together by screws 24, the annular stepped portions 7 and 8 thereof provide an annular groove formed along the inner peripheral portions of the annular frame means, that is an assembly of the frame members 2 and 3, having a depth toward the outside peripheral portions of the annular frame members 2 and 3. The heater elements 12 and 13 are each mounted in the assembly of the frame members 2 and 3 so that a part of peripheral portions thereof is received in a part of said annular groove. The heater elements 12 and 13 in the shown embodiment have one side length which is slightly smaller than a corresponding one outside length of the annular stepped portions 7 and 8, which should preferably be the same with one another, while the length of the other side of the heater elements 12 and 13 perpendicular to said one side is substantially smaller than a half of the corresponding outside length of the annular stepped portions 6 and 7, which again should preferably be the same with one another. Therefore, when the heater elements 12 and 13 are mounted in the assembly of the frame members 2 and 3 with their three sides closely adjacent to the bottom of the annular groove, a substantial space 14 is left between the two heater elements. This space operates as the aforementioned free portion of the cross section of the air passage left as untraversed by the heater element. In the illustrated embodiment a small clearance is left between the bottom of the annular groove and the opposing side edges of the heater elements so as to allow for thermal expansion of the heater elements with no stress being caused thereby.

In the actual heater structure, various insulator elements are inserted, when necessary, between two adjacent electroconductive elements or portions, as obvious to those skilled in the art. Therefore, these insulator elements are properly shown in various figures, with a pertinent cross sectional identification, when shown in section, without particularly referring thereto with reference numerals in the descriptions, for the purpose of brevity of the specification.

On one side of the heater elements 12 and 13, there is provided an electrode 15 of a substantially T-shape, with a portion 15a thereof corresponding to the top bar of the T-shape lying in engagement with one side edge portions of the heater elements 12 and 13, while a portion 15b corresponding to the central post portion of the T-shaped electrode element extends from the top bar portion outwardly toward an outside peripheral portion of the frame means. Although no details are shown in the FIGS. 1-3, the portion 15a of the electrode 15 is in electrical contact with the longitudinal rib portions of the lattice structure of the heater elements 12 and 13 in alternate spaces therebetween, as described with reference to FIG. 21, via some proper terminal means such as shown in FIG. 21. The free end portion of the central post portion 15b of the electrode member is exposed in a local cavity 16 formed at a proper position by the combination of a through hole 16a formed in the upper frame member 3 and a bottomed hole 16b formed in the lower frame member 2. A bolt 17 is mounted through a hole 18 formed at a side portion of the lower frame member 2 as electrically insulated from the frame members by proper insulator elements including a sleeve menber, and the portion 15b of electrode element is mechanically as well as electrically connected to an inner end portion of the bolt 17 by a nut 19 in the local cavity 16. The outer end of the bolt 17 bears fastening nuts 20.

On the other side of the heater elements 12 and 13, there is also provided another electrode element 21 having again a T-shape, a portion 21a of which corresponding to the top bar of the T-shape is engaged with the other side edge portions of the heater elements 12 and 13. The portion 21a is again in electrical contact with the some selected side surfaces of the longitudinal ribs of the lattice structure of the heater elements 12 and 13, in the same manner as described with regard to the electrode element 15. The central post portion of the electrode element 21b which also extends outwardly from the top bar portion 21a toward an outer peripheral portion of the annular frame means is also exposed in a local cavity 22 provided by the combination of a through hole 25a formed in the upper frame member 3 and a bottomed hole 22b formed in the lower frame member 2. The free end portion of the electrode element 21 exposed in the local cavity 22 is fastened to the frame member 2 by a screw 23, whereby the electrode element 21 is also electrically connected to the frame member 2 for earthing.

Figure 4:
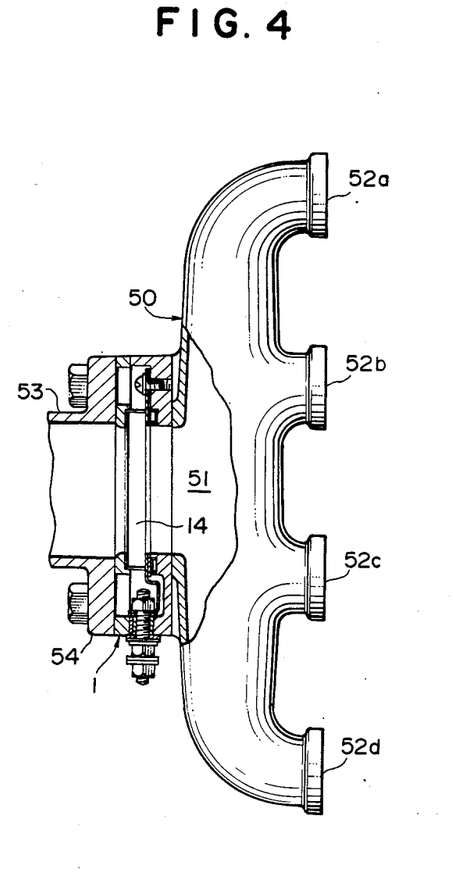
FIG. 4 is a partially sectional view of a part of an air intake structure of an engine, in which the air heater shown in FIGS. 1-3 is incorporated.

FIG. 4 shows an example of the manner of mounting the air heater shown in FIGS. 1-3 in the air intake structure of an internal combustion engine having four cylinders. Reference number 50 designates an intake manifold having an inlet port 51 and four outlet ports 52a, 52b, 52c and 52d. It is of course desirable that the distribution of supply of air to the four outlet ports 52a-52d is as uniform as possible. It is also desirable that, when the preheating is applied to the intake air by an air heater such as shown in FIGS. 1-3, the distribution of preheating applied to the air flowing out through the ports 52a-52d is as uniform as possible. These two requirements can be highly accomplished by a proper design of the air intake construction including the manifold without being obstructed by the incorporation of an air heater such as in FIGS. 1-3 in which only a part of the cross section of the intake passage is traversed by a perforated plate heater element while the remaining part of the cross section is left free of such a heater element, when the air heater is arranged in such a manner that the slit opening 14 is arranged in parallel with the line of arrangement of the output ports 52a-52d of the manifold 50. In FIG. 4, reference numerals 53 designates an intake air conduit means through which intake air is conducted from the left side in the figure toward rightward. As apparent from FIG. 4, the air heater 1 is mounted between a flange portion 54 of the conduit means and the intake port 51 of the intake manifold 50 so that the elongated free passage portion 14 left between the heater elements 12 and 13 extends in parallel with the line of arrangement of the manifold outlet ports 52a-52d. By this arrangement, the distribution of the flow of air at the inlet port 51 of the manifold becomes substantially uniform along the direction of arrangement of the outlet ports 52a-52d, just like a uniformly perforated heater element were provided to traverse the entire cross section of the inlet port 51. Therefore, the distribution of air toward the outlet ports 52a-52d will not be adversely affected by the air heater as shown in FIGS. 1-3. Rather, the uniformity of the distribution of air toward the outlet ports 52a-52d will be improved by the provision of the air heater as shown in FIGS. 1-3, by the action of the slit space 14 to linearly distribute the flow of air therealong.

Figure 5:
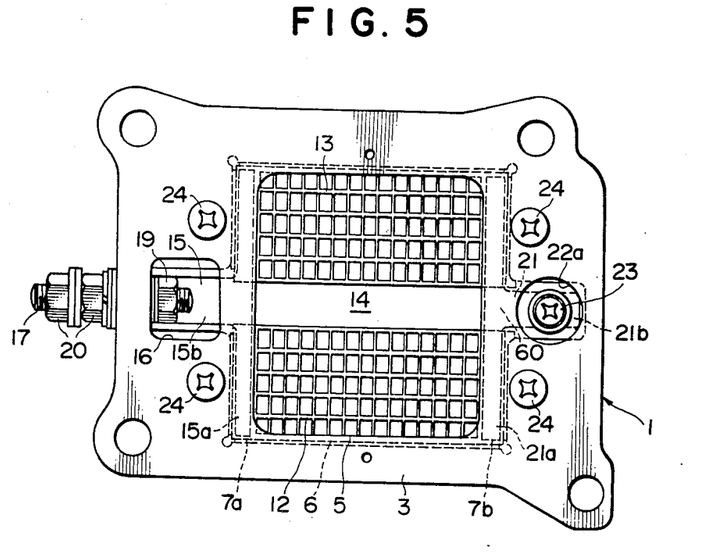
FIGS. 5, 6 and 7 are a set of views similar to the set of FIGS. 1-3, showing a second embodiment of the present invention.
Figure 6:
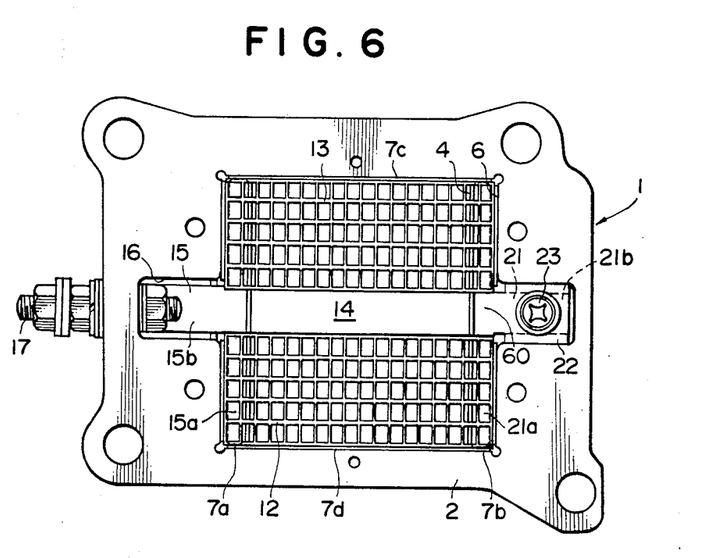
Figure 7:
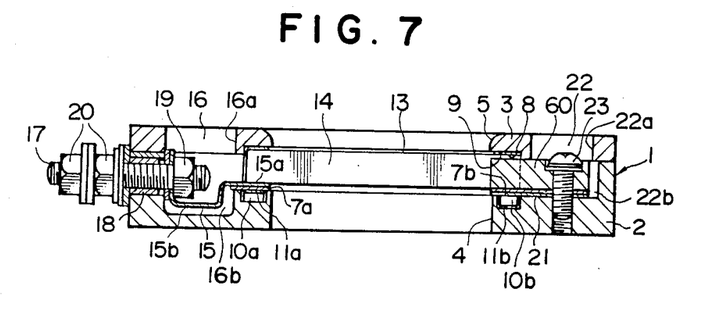

FIGS. 5-7 shows a second embodiment of the air heater according to present invention. A substantial difference of this second embodiment as compared with the first embodiment shown in FIGS. 1-3 resides in that a spacer means 60 is provided to positively space the heater elements 12 and 13 from one another, and to ensure the unobstructed passage 14. In this embodiment, the spacer means 60 is provided by an element separate from the frame member 2 or 3, and is fastened to the lower frame member 2 by the screw 23 which is made a little longer than that used in the embodiment shown in FIGS. 1-3, so to fasten the electrode element 21 as well as the spacer element 60. Other structures of the embodiment shown in FIGS. 5-7 are the same or similar to those shown in FIGS. 1-3, and therefore no further descriptions of this second embodiment will be necessary. However, some portions in this second embodiment have reference numerals corresponding to those attached to the corresponding portions in the first embodiment for the convenience of comparison.

Figure 8:
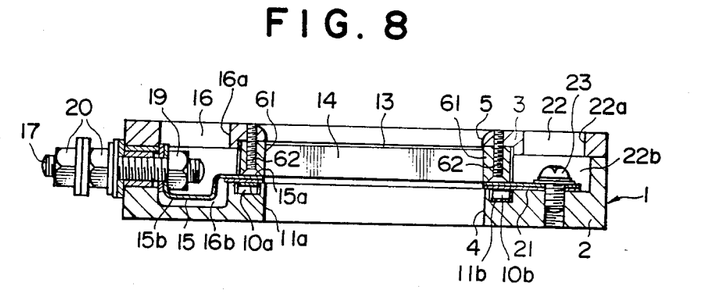
FIG. 8 is a sectional view similar to FIG. 7, showing a third embodiment of the present invention, only in the section.

FIG. 8 shows a third embodiment which is a slight modification of the embodiment shown in FIGS. 5-7. The modification will be understood from comparison of FIGS. 7 and 8, and therefore this third embodiment is shown only by a sectional view of FIG. 8. In this third embodiment, instead of the spacer element 60 in FIG. 7, two smaller spacer element 61 are provided as each being mounted to opposite inner peripheral portions of the upper frame member 3 by screws 62. The function of these spacer elements 61 will be the same as that of the spacer element 60, except that the provision of these two spacer elements 61 at opposite portions of the inner peripheral portions of the frame member 3 would be more desirable in the effect of uniformly separating the two heater elements 12 and 13 from one another so that no slanting of the heater element 12 and/or 13 relative to the frame members should occur. Any further descriptions of this third embodiment will be omitted for brevity of the specification.

Figure 9:
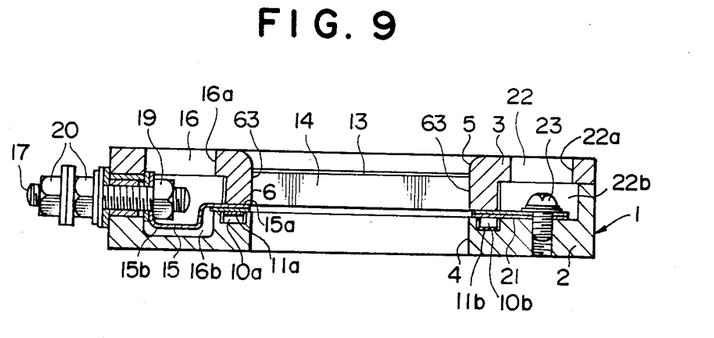
FIG. 9 is a sectional view similar to FIGS. 7 and 8, showing a fourth embodiment of present invention.

FIG. 9 shows a fourth embodiment of the air heater according to the present invention. However, an essential difference of this embodiment as compared with the embodiment shown in FIGS. 1-3 resides in that spacer means 63 are provided, and the difference is, as compared with the embodiment shown in FIGS. 5-7, that the spacer means 63 are formed as integral with the upper frame member 3. The advantages and disadvantages of this fourth embodiment as compared with the former embodiments in function, structure and manufacture will be obvious to those skilled in the art. Therefore, any further description of this embodiment will be omitted also for brevity of the specification, though several reference numerals are attached in the same way. However, it will be noted that such an integral spacer portion may be provided in the lower frame member 2, in both the upper and lower frame members 2 and 3.

Figure 10:
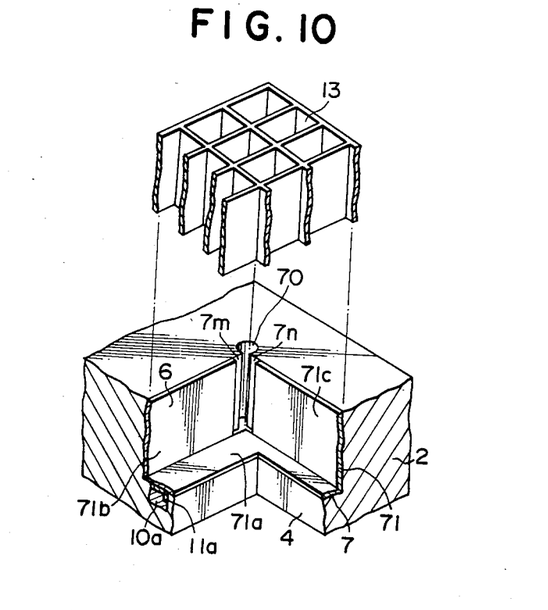
FIG. 10 is a perspective view showing a corner portion of the heater element and the groove structure formed in the frame member for receiving the heater element, incorporated in the above-mentioned embodiments.

FIG. 10 shows a particular corner structure which may be desirably applied to the annular frame member 2 in all of the first through fourth embodiments of the present invention described hereinabove. As already expressed in the preceding figures, the corner portion at which vertical wall portions 7m and 7n extending around the cavity 6 and joining the stepped portion 7 formed in the frame member 2 would join is formed with a stress relief groove 70 so that the two wall portions are not directly joined with one another along a simple line, in order to avoid a high stress concentration to occur at the corner portion. In the shown embodiment the stress relief groove 70 is formed as a cylindrical bore which interferes with imaginary end portions of the walls 7m and 7n which cross one another so as to connect the adjacent end portions of the actual surfaces of the wall 7m and 7n via a substantially cylindrical surface of the stress relief groove 70. In the shown embodiment, an insulator element such as 71 having a annular portion 71a and vertical flap portions 71b and 71c are provided in this area, a part of the annular portion 71a being laid over a leaf spring such as 11a shown in FIG. 3 mounted in a groove such as 10a in FIG. 3, with the flap portions 71a and 71b being laid over the walls 7m and 7n, respectively.

Figure 11:
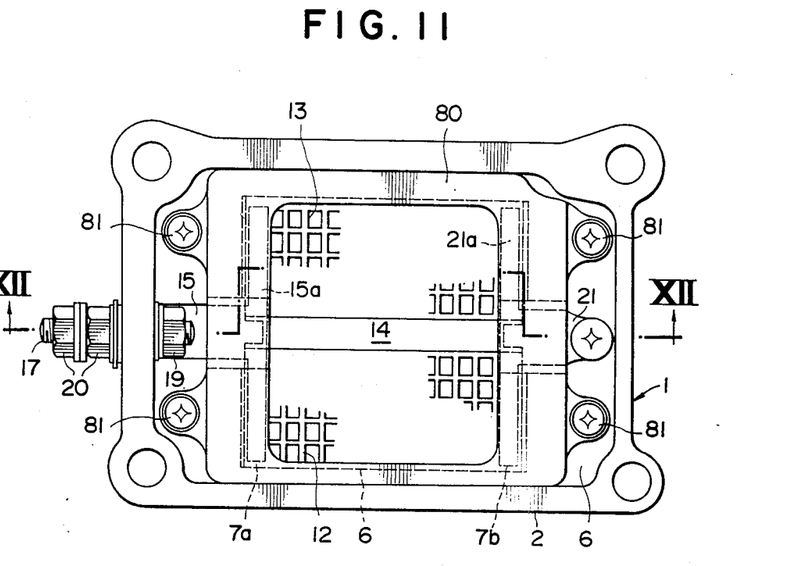
FIG. 11 is a top view showing a fifth embodiment of the present invention.
Figure 12:
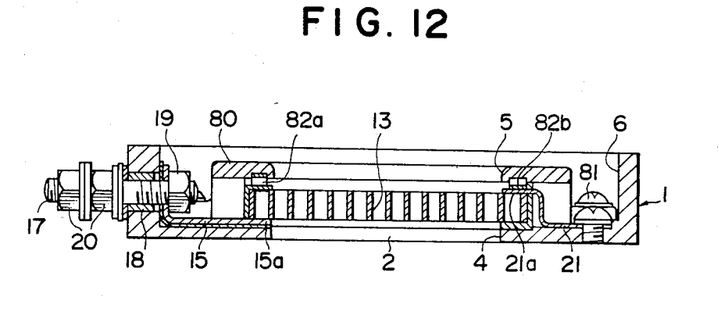
FIG. 12 is a sectional view along line XII—XII in FIG. 11.

FIGS. 11 and 12 show a fifth embodiment of the air heater according to the present invention. In this embodiment, instead of the upper frame member 3 in the preceding embodiments of the type which has the same outer contour as the lower frame member 2 and which is connected therewith at all peripheral portions thereof, the frame means for supporting the heater elements is principally provided by the lower frame member 2 formed with a cavity 6 which is large enough to hold the two heater elements 12 and 13 and also an upper annular frame member 80 of a different type which is mounted into the cavity 6 of the annular frame member 2 so as to fasten the heater elements to the frame member 2. The advantage of this embodiment is, as understood from the showing of FIG. 12, the force applied to the frame means in the direction of the thickness thereof when the air heater is mounted into an air intake construction such as shown in FIG. 4, is supported only by the frame member 2 which is integral as a whole, with no danger that a part of such a force is applied to the heater elements 12 and 13 which are made of fragile ceramic materials and are liable to breakage even by a small force applied thereto. In this embodiment, the function of the annular frame member 80 is only to hold the heater elements 12 and 13 to the frame member 2, and therefore the frame member 80 is designed to be a lighter and thinner structure than the upper frame members 3 in the preceding embodiments. The frame member 80 is fastened to the frame member 2 by four screws 81.

In this embodiment, as seen in FIG. 12, the electrode 15 engages to the lower side of the heater elements 12 and 13, while the electrode 21 engages the upper side of the heater elements 12 and 13, by contrast to the corresponding structure in the preceding embodiments. In this case, the electrode treatment for forming electrode layers such as the fine dotted portions in FIG. 21 may be applied only to top and bottom surfaces of the ceramic lattice body, such as surfaces 102c and 102d of the lateral beems 102 in FIG. 21, and further surfaces 101c and 101d of the longitudinal ribs 101. In this case, a strip like electrode element such as the top bar portion 15a in FIG. 1 may directly contact with side edge portions of the heater elements 12 and 13 at all portions thereof. These conditions also apply to the other electrode 21 which engages the upper side of the side edge portions of the heater elements 12 and 13. In this case, electric current flows traverse longitudinal and lateral ribs across the height thereof while generating Joule heat therein. As is apparent, in the lattice structures of the shown dimensional designs, a higher voltage will be required in the embodiment shown in FIGS. 11 and 12 than in the preceding embodiments.

Corrugated springs 82a and 82b similar to the corrugated springs 11a and 11b in the preceding embodiments are provided in this embodiment between the heater elements and the upper frame member 80. Other structures with regard to mounting of the electrodes, etc. are substantially the same as those in the preceding embodiments. Therefore, any further descriptions about this embodiment will be omitted also for the brevity of the specification.

Figures 13, 14:
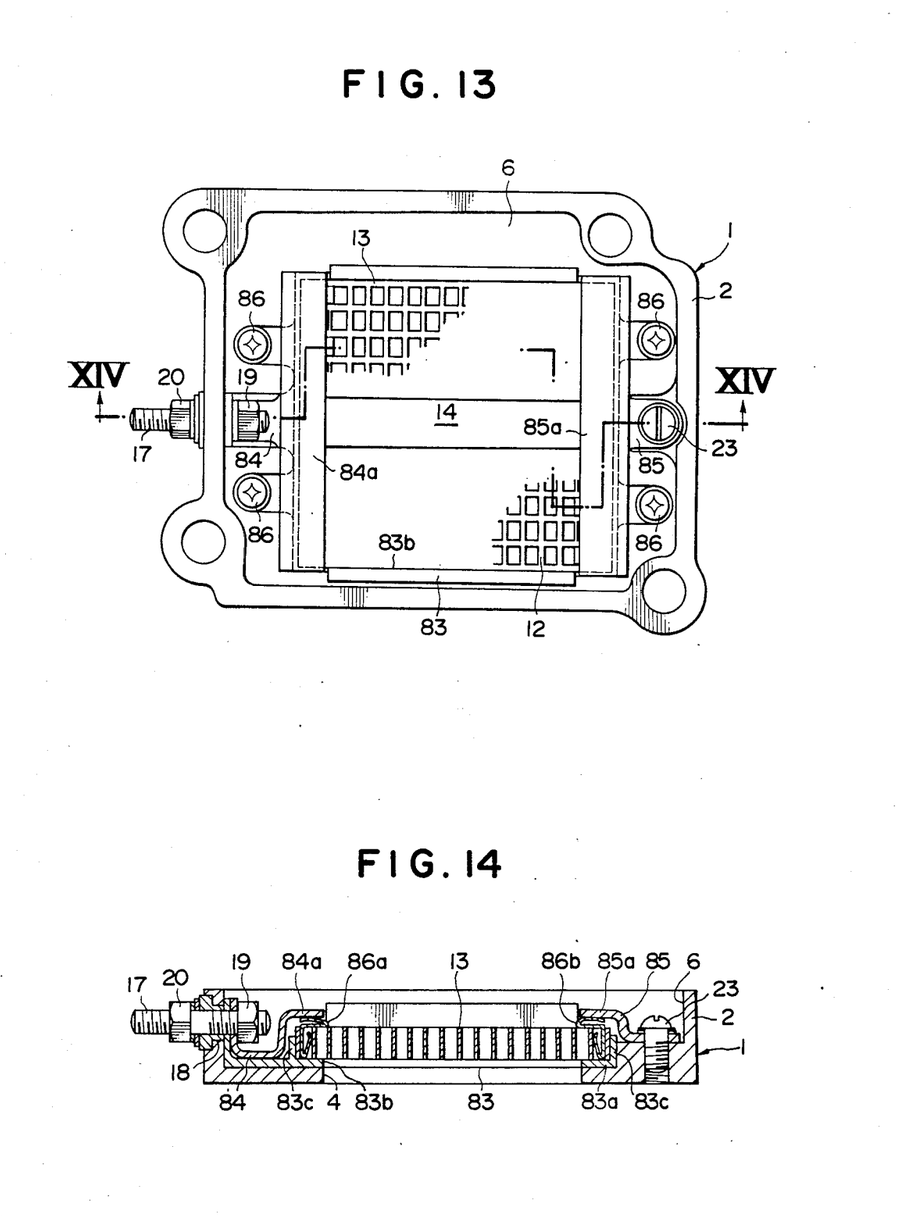

FIGS. 13 and 14 are a set of views similar to the set of FIGS. 11 and 12, showing a sixth embodiment of the air heater according to the present invention. This sixth embodiment is of the same type as the fifth embodiment shown in FIGS. 11 and 12 in that only the lower annular frame member 2 receives the assembling force applied to the air heater. However, in this sixth embodiment, an annular upper frame member such as the annular frame member 80 in the embodiment shown in FIGS. 11 and 12 is omitted, and the heater elements 12 and 13 are mounted to the lower frame member 2 by the cooperation of an annular insulator frame element 83 and electrode elements 84 and 85 which not only electrically operate in the same manner as the electrodes 15 and 21, respectively, in the preceding embodiments, but also mechanically operate to hold the heater elements 12 and 13 against the frame member 2, in fact with interposition of spring bars 86a and 86b. The annular insulator frame element 83 has an annular flat portion 83a having a central opening 83b which aligns with the central opening 4 in the frame member 12, and an annular raised wall portion 83c which surrounds the heater elements 12 and 13, and is fastened to the frame member 2 at its flat portion 83a by four screws 86. Other details of the structures of this embodiment will now be clear to those skilled in the art with no further description.

Figure 15:
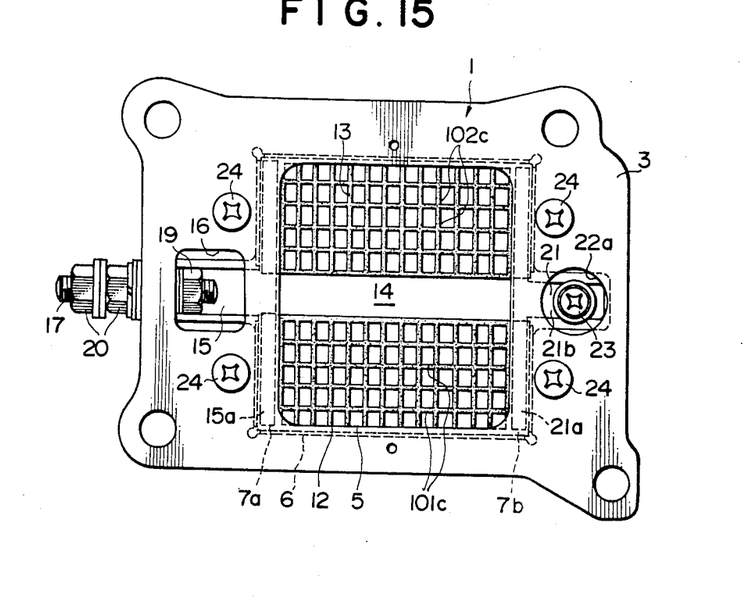
FIGS. 15, 16 and 17 are a set of views similar to the set of FIGS. 1-3, showing a seventh embodiment of the present invention.
Figure 16:
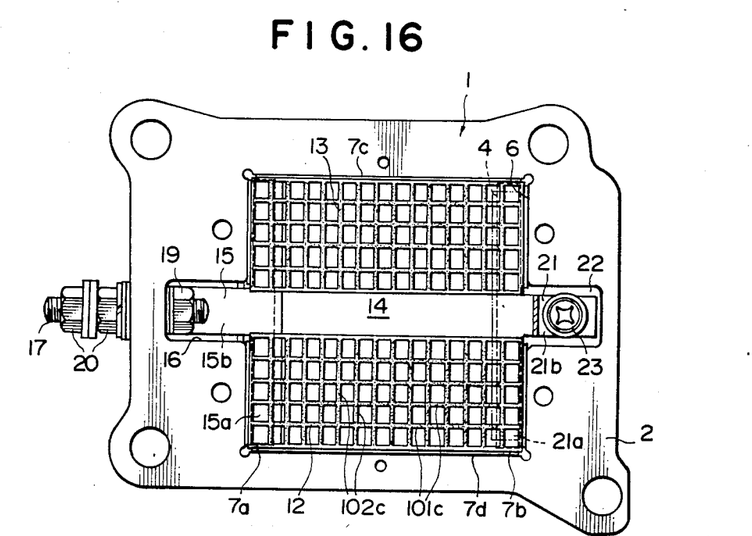
Figure 17:
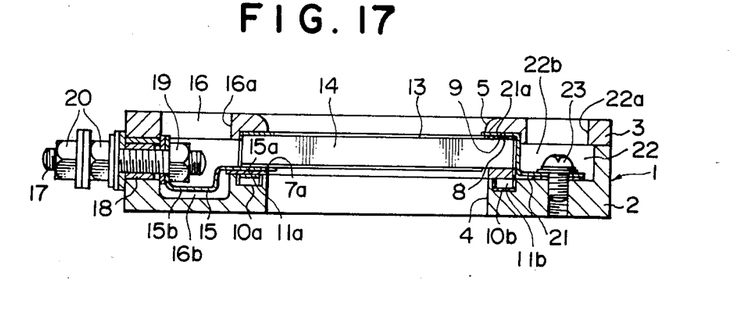

FIGS. 15–17 show a seventh embodiment of the air heater according to the present invention, in which the aspect of the invention is principally directed to the electrode structure of the heater elements 12 and 13. As already described with reference to FIG. 21, in the conventional air heater structure employing the heater element of the type which has a lattice body made of a ceramic material and a surface electrode layer formed thereon by a surface treatment, when the heater element is assembled with opposite electrodes as shown in FIGS. 15–17, the top and bottom surfaces 101c and 101d of the longitudinal ribs 101 as well as the top and bottom surfaces 102c and 102d of the lateral ribs 102, as viewed in FIG. 21, were formed with the electrode layers from one extreme end to the other extreme end thereof. However, some narrow strip portions located adjacent the opposite extreme ends of the heater element operate only as a means for mechanically fastening the heater element to the frame means, but do not operate as a means for generating Joule heat. In view of this, in the embodiment shown in FIGS. 15–17, the application of the electrode layer, which is made of precious metal such as nickel and silver, is ended before the extreme end of the longitudinal ribs 101, as shown in FIG. 16, wherein the end portion of the top surfaces of the longtiudinal and lateral ribs 101 and 102 corresponding to the one mesh of the lattice structure, bearing no fine dots and shown in pater's white, are not formed with the electrode layers. Other structures of the air heater shown in FIGS. 15-17 are generally similar to those shown in FIGS. 1-3, except the structures of the electrodes which are similar to those shown in FIGS. 11 and 12.

Figure 18:
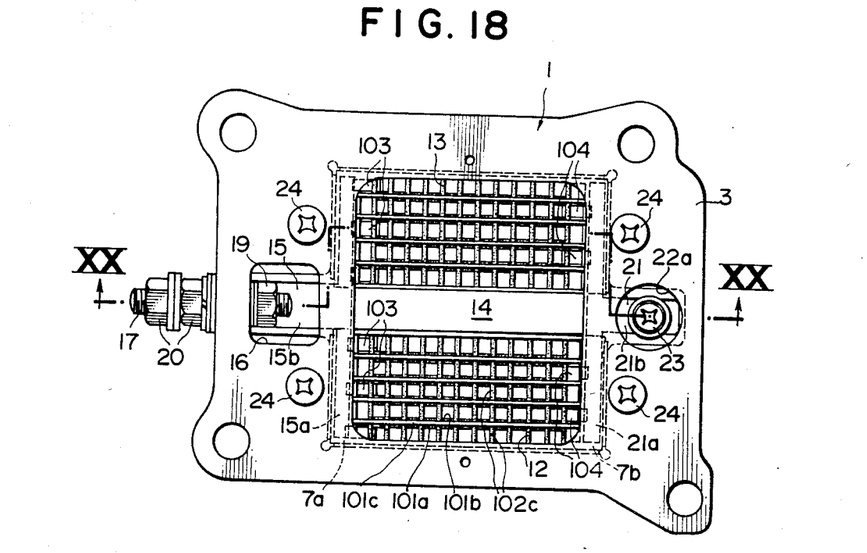
Figure 19:
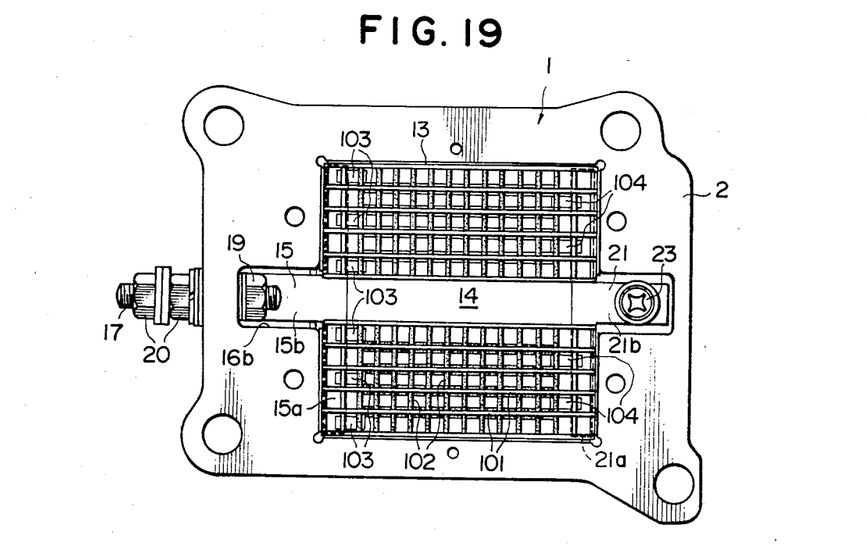
Figure 20:
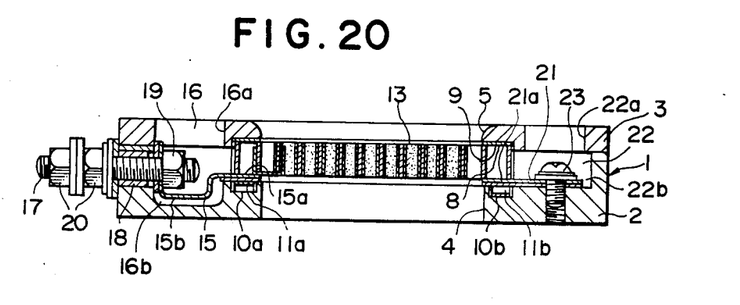
FIG. 20 is a sectional view along line XX—XX in FIG. 18.

FIGS. 18-20 show an eighth embodiment of the air heater according to the present invention, which relates to the heater element, as the preceding seventh embodiment. This embodiment is also to stop the application of the electrode layer forming treatment applied to the surface of the ceramic lattice body for the heater element before the extreme end of the longitudinal ribs 102, for the same purpose intended in the preceding seventh embodiment, wherein the electrode layers applied to the opposite side surfaces 101a and 101b of the longitudinal ribs 101 are stopped before the extreme end thereof to leave a part of the lattice body corresponding to a length of about two meshes, as shown in FIGS. 18-20 as well as in FIG. 21, as not bearing the fine dots and being left in paper's white.

Although the present invention has been shown and described with reference to several preferred embodiments thereof, and in terms of the illustrative drawings, these are not to restirct the scope of the invention thereby, and various modifications, omissions, and alterations could be conceived by one skilled in the art with regard to the form and the content of any particular embodiment, without departing from the scope of the present invention. Therefore it is desired that the scope of the present invention, and of the protection sought to be granted by Letter Patent, should be defined not by any of the shown embodiments or the drawings, but solely by the scope of the appended claims, which follow.

What is claimed is:

1. An air heater for heating intake air for an internal combustion engine, comprising a frame means for defining an opening for passing air therethrough, and at least one piece of heater element in the shape of a perforated plate supported by said frame means so as to traverse a predetermined part of the opening area of said opening, a substantial part of said opening area being left free as untraversed by said heater element wherein said frame means is an annular frame means which defines said opening by inner peripheral edges thereof, and which has an annular groove formed along inner peripheral portions thereof so as to extend from said inner peripheral edges into said frame means toward outer peripheral portions thereof, said heater element being supported by said frame means with a first part thereof being received in said annular groove, while a second part thereof is exposed to the opening area of said opening and wherein said annular frame means is an assembly of two annular frame members joined together along a border extending through and including bottom portions of said annular groove.

2. An air heater for heating intake air for an internal combustion engine, comprising a frame means for defining an opening for passing air therethrough, and at least one piece of heater element in the shape of a perforated plate supported by said frame means so as to traverse a predetermined part of the opening area of said opening, a substantial part of said opening area being left free as untraversed by said heater element wherein said frame means comprises a first annular frame member having an annular flat portion and an annular flange portion raised from outer peripheral portions of said annular flat portion, said annular flat portion defining said opening by inner peripheral edges thereof, a second annular frame member adapted to be engaged into an annular space generally defined by said annular flat portion and said annular flange portion of said first frame member, said second annular frame member having a flat inner peripheral portions, the innermost peripheral portions thereof defining said opening, and an annular inside flange portion located adjacent said innermost peripheral portions with an annular strip area of said flat inner peripheral portions left around said innermost peripheral portions, and two linear hold members, said heater element being supported by said annular frame means with a part of peripheral portions thereof being first received by said second annular frame member along a part of said annular inside flange portion and a corresponding part of said annular strip area of said flat inner peripheral portions thereof, and secondly clamped by said two linear hold members being engaged with opposite side portions of said heater element, said two linear hold members each being fastened to said first frame member.

3. An air heater according to claim 2, wherein said second annular frame member is made of an electrical insulating material.

* * * * *